(12) United States Patent
Assarpour et al.

(10) Patent No.: US 9,152,423 B2
(45) Date of Patent: Oct. 6, 2015

(54) METHOD AND APPARATUS FOR EFFICIENT LOOP INSTRUCTION EXECUTION USING BIT VECTOR SCANNING

(75) Inventors: Hamid Assarpour, Arlington, MA (US); Mike Craren, Holliston, MA (US); Rich Modelski, Hollis, NH (US)

(73) Assignee: AVAYA INC., Basking Ridge, NJ (US)

( * ) Notice: Subject to any disclaimer, the term of this patent is extended or adjusted under 35 U.S.C. 154(b) by 1107 days.

(21) Appl. No.: 13/071,730

(22) Filed: Mar. 25, 2011

(65) Prior Publication Data

US 2012/0246449 A1    Sep. 27, 2012

(51) Int. Cl.
*G06F 15/00* (2006.01)
*G06F 7/38* (2006.01)
*G06F 9/00* (2006.01)
*G06F 9/44* (2006.01)
*G06F 9/32* (2006.01)
*G06F 9/30* (2006.01)

(52) U.S. Cl.
CPC .............. *G06F 9/325* (2013.01); *G06F 9/3013* (2013.01); *G06F 9/30018* (2013.01); *G06F 9/30061* (2013.01); *G06F 9/30072* (2013.01); *G06F 9/327* (2013.01)

(58) Field of Classification Search
None
See application file for complete search history.

(56) References Cited

U.S. PATENT DOCUMENTS

| 5,023,823 | A | * | 6/1991 | Cargin et al. | 361/679.4 |
| 5,987,589 | A | * | 11/1999 | Kawasaki et al. | 712/32 |
| 6,032,190 | A | * | 2/2000 | Bremer et al. | 709/238 |
| 7,082,477 | B1 | * | 7/2006 | Sadhasivam et al. | 709/246 |

* cited by examiner

*Primary Examiner* — George Giroux
(74) *Attorney, Agent, or Firm* — Anderson Gorecki & Rouille LLP

(57) ABSTRACT

A method, apparatus and computer program product for performing efficient loop instruction execution using bit vector scanning is presented. A bit vector is scanned, each bit in the bit vector representing at least one of a feature and a conditional status. The presence of a bit of said bit vector set to a first state is detected. The bit is set to a second state. An instruction address for a routine corresponding to said bit set to a first state is looked up using a bit position of said bit that was set to a first state. The routine is executed. The scanning, said detecting, said setting and said using are repeated until there are no remaining bits of said bit vector set to said first state.

14 Claims, 4 Drawing Sheets

10a

| | 0 | 1 | 2 | 3 | 4 | 5 | 6 | 7 | 8 | 9 |
|---|---|---|---|---|---|---|---|---|---|---|
| | 0 | 0 | 1 | 0 | 0 | 0 | 1 | 0 | 0 | 1 |

| | 0 | 1 | 2 | 3 | 4 | 5 | 6 | 7 | 8 | 9 |
|---|---|---|---|---|---|---|---|---|---|---|
| | 0 | 0 | 0 | 0 | 0 | 0 | 1 | 0 | 0 | 1 |

| | 0 | 1 | 2 | 3 | 4 | 5 | 6 | 7 | 8 | 9 |
|---|---|---|---|---|---|---|---|---|---|---|
| | 0 | 0 | 0 | 0 | 0 | 0 | 0 | 0 | 0 | 1 |

| | 0 | 1 | 2 | 3 | 4 | 5 | 6 | 7 | 8 | 9 |
|---|---|---|---|---|---|---|---|---|---|---|
| | 0 | 0 | 0 | 0 | 0 | 0 | 0 | 0 | 0 | 0 |

*Figure 1D*

METHOD AND APPARATUS FOR EFFICIENT LOOP INSTRUCTION EXECUTION USING BIT VECTOR SCANNING

BACKGROUND

Multi-threaded packet processors are used to provide a simpler instruction execution pipeline which serves to eliminate pipeline hazards, resource conflicts, branch delays, pipeline stalls, and pipeline stage bypasses. Multi-threaded packet processors also provide a simpler programming model by hiding memory access latencies, hiding coprocessor latencies, eliminating branch delays, and removing operand dependencies. Further, the use of multi-threaded packet processors produces better utilization of available memory bandwidth and better utilization of coprocessors. As part of packet processing, there are certain features that can, by configuration, be enabled or disabled. When the feature is enabled then a routine related to the feature is executed, otherwise it is ignored.

SUMMARY

Conventional multi-threaded packet processors mechanisms such as those explained above suffer from a variety of deficiencies. One such deficiency associated with multi-threaded packet processors is that, in certain situations, packets may experience higher processing latency. In particular, the testing of feature flags can lead to higher processing latency. Typically, these feature flags are tested one by one to determine whether they are enabled. The problem is that if only a few of these features are enabled (the worst case is only one feature is enabled), then the overhead to find the enabled feature is very high since the packet processing has to evaluate all disabled feature flags as well. In addition to this overhead, the packet processor typically require multiple instructions to test each feature flag.

Embodiments of the invention significantly overcome such deficiencies and provide mechanisms and techniques that provide a zero-overhead single instruction execution per enabled feature flag.

In a particular embodiment of a method for providing for efficient loop instruction execution using bit vector scanning, the method includes scanning a bit vector, each bit in the bit vector representing at least one of a feature and a conditional status and detecting the presence of a bit of the bit vector set to a first state (e.g. set to a true value). The method further includes setting the bit to a second state (e.g. a false state) and using a bit position of the bit that was set to a first state to look up an instruction address for a routine corresponding to the feature or conditional status corresponding to the bit set to a first state. Further, the method involves executing the routine and repeating the scanning, the detecting, the setting and the using until there are no remaining bits of the bit vector set to the first state.

Other embodiments include a computer readable medium having computer readable code thereon for providing efficient loop instruction execution using bit vector scanning. The compute readable medium includes instructions for scanning a bit vector, each bit is the bit vector representing at least one of a feature and a conditional status and detecting the presence of a bit of the bit vector set to a first state. The compute readable medium further includes instructions for setting the bit to a second state and using a bit position of the bit that was set to a first state to look up an instruction address for a routine corresponding to the bit set to a first state. Further, the compute readable medium includes instructions for executing the routine and repeating the scanning, the detecting, the setting and the using until there are no remaining bits of the bit vector set to the first state.

Still other embodiments include a computerized device (e.g. a multi-threaded packet processor) configured to process all the method operations disclosed herein as embodiments of the invention. In such embodiments, the computerized device includes a memory system, a processor, communications interface and an interconnection mechanism connecting these components. The memory system is encoded with a process that provides efficient loop instruction execution using bit vector scanning as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing efficient loop instruction execution using bit vector scanning as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1A depicts a diagram of a bit vector in accordance with embodiments of the invention;

FIG. 1B depicts a diagram of the bit vector of FIG. 1A after a first execution of the vector scan in accordance with embodiments of the invention;

FIG. 1C depicts a diagram of the bit vector of FIG. 1B after a second execution of the vector scan in accordance with embodiments of the invention;

FIG. 1D depicts a diagram of the bit vector of FIG. 1C after a third execution of the vector scan in accordance with embodiments of the invention;

DETAILED DESCRIPTION

Figure 2:
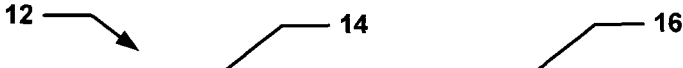
FIG. 2 depicts a diagram of a jump table in accordance with embodiments of the invention.

Branch decisions in a processor are frequently based on the presence of bits in a bit vector. Further, the bit vector has an order of precedence. Thus, for purposes of branching, the presence of the leftmost or rightmost bit indicates which bit to use to make a branch decision. The location of the bit in the bit vector can be used to identify and branch to a unique branch point. Since this is a common operation in packet processing, performing this operation in a single instruction can reduce instruction overhead. Reducing instruction overhead in a packet processor increases packet throughput and reduces processing latency, since instruction overhead is inversely proportional to packet throughput.

The presently described method and apparatus for efficient loop instruction execution using bit vector scanning is a single instruction in a multi-threaded packet processor; i.e., each thread can execute such instruction totally independently. A hardware flag register is used to store a bit vector. Each bit in the bit vector represents a feature or a conditional status. This register is both readable and writeable by the processor/CPU execution unit. This register may be a dedicated hardware register or part of the CPU's general register file. The width of the bit vector is limited to the available width of the hardware register. At any given time the bit vector may have some bits on (True) or off (False).

The presently described method and apparatus for efficient loop instruction execution using bit vector scanning performs the following steps in a single instruction execution with zero overhead. First, the hardware register is scanned either from the leftmost significant bit or rightmost significant bit to find the first bit that is set to a first state (e.g. a true value). The scanning function automatically and efficiently skips all bits that are set to a second state (e.g. false values).

Next, when the first bit set to the first state is found, it is set to a second state, and then its bit position number within the hardware register is used to lookup a memory where each entry has a corresponding instruction address/program pointer to the start of a routine associated with the hit bit. Before the instruction Program Counter (PC) is updated from this table, the PC content is saved to a hardware link register.

Finally, at the end of the execution of the routine, a branch to the hardware link register is used to jump back to execute this special instruction again. Since the original bit that caused the branch has been set to a second state, the execution of this instruction skips over this bit and finds the next bit set to the first state. This operation (the scanning of the bit vector, the setting bits to a second state, the performing memory lookups, and executing routines) continues until the content of the hardware register is set to all second state values at which point the next instruction is executed. It is clear from the above that if only one feature flag or no flag is set, this instruction is executed only once. Thus, a single instruction can be used to test a bit, and branch to a specific location. Since the instruction clears the bit that it tests, an instruction loop is used to process a series of bits.

Referring now to FIGS. 1A-1D in conjunction with FIG. 2, an example will be described. Note, that the example is for explanation purposes only, and is not intended to limit the present invention in anyway. A bit vector and an associated jump table are described. The bit vector contains a number of bits, each bit representing a different feature or conditional status. The jump table contains an index and a series of routine addresses, one routine address for each index entry. Each routine address is the starting address for a routine for handling the associated feature or conditional status indicated in the bit vector.

Referring now to FIG. 1A, a bit vector 10a is shown. In this example a 10-bit wide bit vector is shown, though it should be appreciated that the bit vector can have any width. Bit vector 10a has bits 2, 6 and 9 set to a "True" value (first state) and the remaining bits, bits 0, 1, 3, 4, 5, 7 and 8 set to a "False" value (second state). Each bit represents a feature or conditional status. Bit vector 10a is scanned until a first bit at a first state is encountered. When the scanning of bit vector 10a reaches bit 2, it detects that this bit is set to the first state and performs a series of steps. In this example, bit 2 being in the first state indicates that this packet should be mirrored. Mirroring requires the packet be copied and the duplicate packet forward to an analyzer or monitor. First, bit 2 is set to the second state (set to a zero value). Next, jump table 12 is referenced. The routine address 16 associated with the index 14 for the bit position is then used as a reference and a jump to that address is performed. In this case, since bit 2 was set to a first state, the index for bit 2 is accessed and the routine address at this index location (010000000) is executed. This address is the beginning address of a routine for mirroring as indicated by bit 2 of the bit vector 10a being in a first state. Once the mirroring routine beginning at address 010000000 is completed, a branch to the link register is performed and the bit vector is scanned again.

At this time, bit vector 10b results from bit vector 10a having it's second bit set to a second state. When the scanning of bit vector 10b reaches bit 6, it detects that this bit is set to the first state and performs a series of steps. In this example, bit 6 being in the first state indicates that this packet is part of a policing policy and may be rate limited. First, bit 6 is set to a second state (set to a zero value). Next, jump table 12 is referenced. The routine address 16 associated with the index 14 for the bit position is then used as a reference and a jump to that address is performed. In this case, since bit 6 was set to a first state, the index for bit 6 is accessed and the routine address at this index location (030000000) is executed. This address is the beginning address of a routine for packet policing as indicated by bit 6 of the bit vector 10b being in a first state. Once the routine beginning at address 030000000 is completed, a branch to the link register is performed and the bit vector is scanned again.

At this time, bit vector 10c results from bit vector 10b having it's sixth bit set to a second state. When the scanning of bit vector 10c reaches bit 9, it detects that this bit is set to the first state and performs a series of steps. In this example, bit 9 being in the first state indicates that this packet is part of an Internet Protocol (IP) fix wherein packets are monitored for statistic gathering. First, bit 9 is set to a second state (set to a zero value). Next, jump table 12 is referenced. The routine address 16 associated with the index 14 for the bit position is then used as a reference and a jump to that address is performed. In this case, since bit 9 was set to a first state, the index for bit 9 is accessed and the routine address at this index location (04F000000) is executed. This address is the beginning address of a routine for IP fix as indicated by bit 9 of the bit vector 10c being in a first state. Once the routine beginning at address 04F000000 is completed, a branch to the link register is performed and the bit vector is scanned again.

At this time, bit vector 10d results from bit vector 10c having bit 9 set to a second state. A scan of bit vector 10d results in no bits being in the first state so the next instruction is executed.

Figure 3:
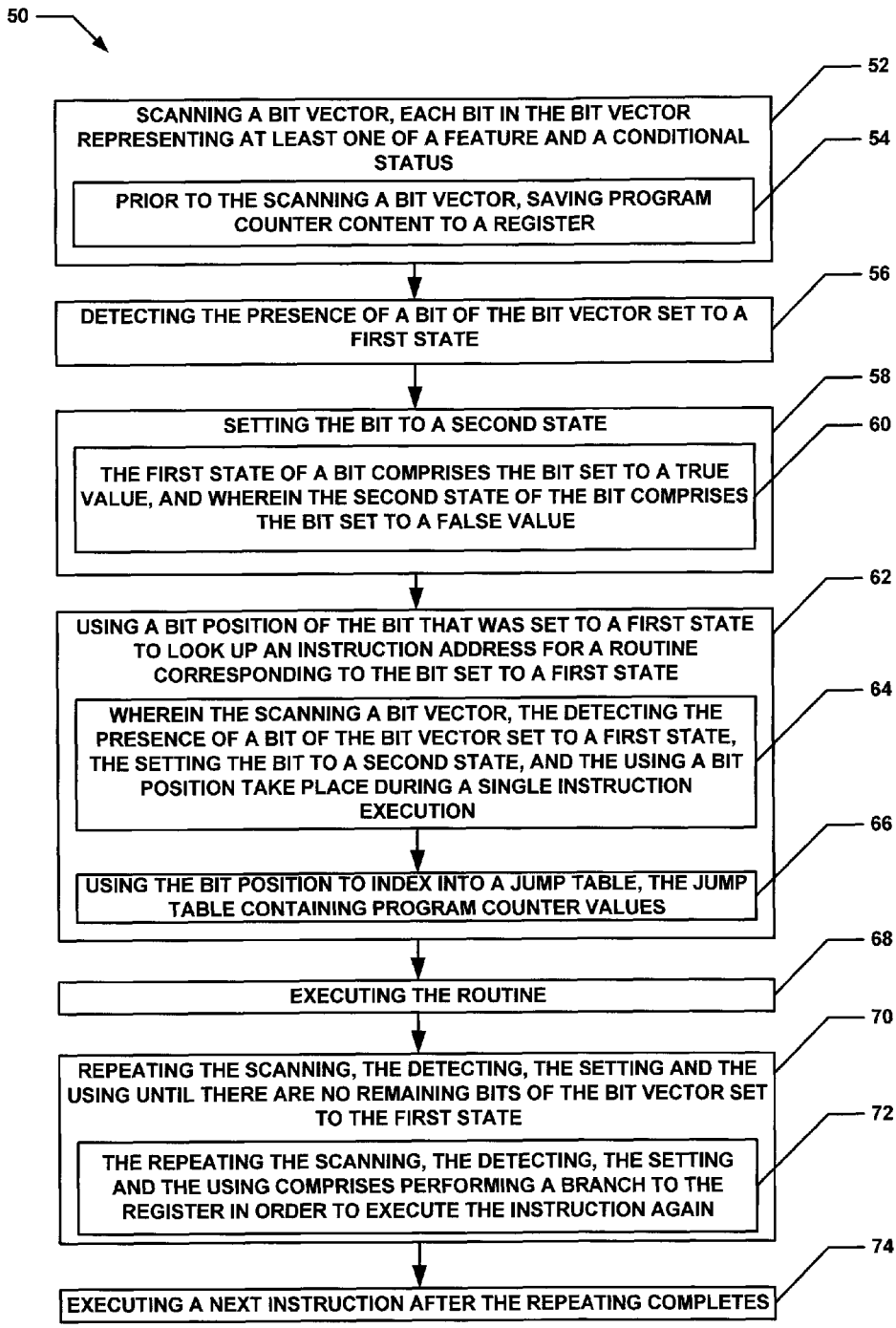
FIG. 3 comprises a flow diagram of a particular embodiment of a method for providing efficient loop instruction execution using bit vector scanning in accordance with embodiments of the invention.

A flow chart of the presently disclosed method is depicted in FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 50 for performing efficient loop instruction execution using bit vector scanning is shown. Method 50 begins with processing block 52 which discloses scanning a bit vector, each bit in the bit vector representing at least one of a feature and a conditional status. For example, features or conditional status can include, but are not limited to packet minoring, packet re-mark, IP fix or packet policing. Processing block 54 states prior to the scanning a bit vector, saving Program Counter content to a register. This is done so that the scan instruction can be executed again upon return from the execution of the routine indicated by the vector bit.

Processing block 56 recites detecting the presence of a bit of the bit vector set to a first state. Processing block 58 discloses setting the bit to a second state. As shown in processing block 60, in this particular embodiment, the first state of a bit comprises the bit set to a true value, and wherein the second state of the bit comprises the bit set to a false value.

Processing continues with processing block 62 which recites using a bit position of the bit that was set to a first state to look up an instruction address for a routine corresponding to the bit set to a first state. As further shown in processing block 64, the scanning a bit vector, the detecting the presence of a bit of the bit vector set to a first state, the setting the bit to a second state, and the using a bit position take place during a single instruction execution. Processing block 66 discloses using the bit position to index into a jump table, the jump table containing program counter values. Each entry in the jump table is a pointer to the first instruction of a routine corresponding to the bit in the bit vector that was set to a first state.

Processing block 68 states executing the routine. The routine corresponding to the indicted feature or conditional status is executed. For example, when the bit indicates a packet mirroring is enabled, for this packet, then a packet minoring routine is executed.

Processing block 70 recites repeating the scanning, the detecting, the setting and the using until there are no remaining bits of the bit vector set to the first state. As shown in processing block 72, the repeating the scanning, the detecting, the setting and the using comprises performing a branch to the register in order to execute the instruction again. This is done until the vector contains all bits set to the second state. Processing block 74 discloses executing a next instruction after the repeating completes.

In such a manner described above, mechanisms and techniques that provide a zero-overhead single instruction execution per enabled feature flag are provided.

Figure 4:
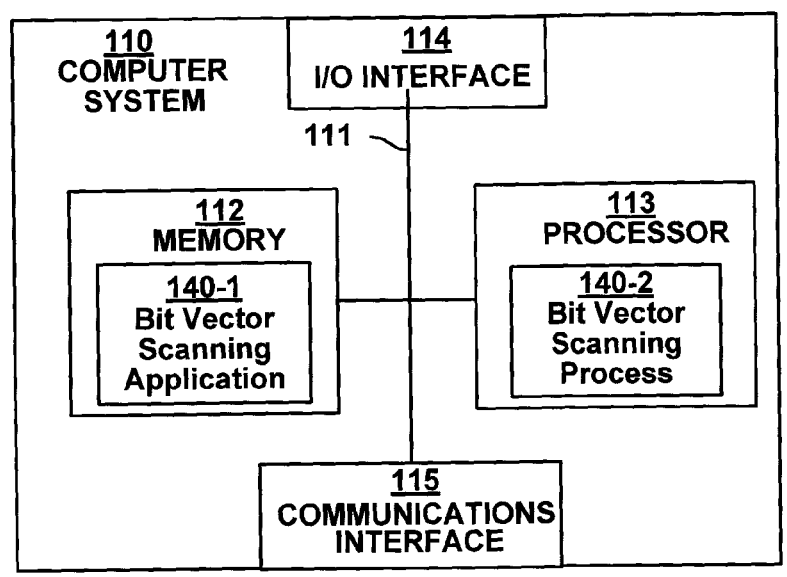
FIG. 4 illustrates an example computer system architecture for a computer system (e.g. a multi-threaded packet processor) that performs efficient loop instruction execution using bit vector scanning in accordance with embodiments of the invention.

FIG. 4 is a block diagram illustrating example architecture of a computer system (e.g., a multi-threaded packet processor) 110 that executes, runs, interprets, operates or otherwise performs a bit vector scanning application 140-1 and bit vector scanning process 140-2 suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the bit vector scanning application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a bit vector scanning application 140-1 as explained herein. The bit vector scanning application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a bit vector scanning application 140-1. Execution of a bit vector scanning application 140-1 in this manner produces processing functionality in the bit vector scanning process 140-2. In other words, the bit vector scanning process 140-2 represents one or more portions or runtime instances of a bit vector scanning application 140-1 (or the entire bit vector scanning application 140-1) performing or executing within or upon the processor 113 in the computerized device 110 at runtime.

It is noted that example configurations disclosed herein include the bit vector scanning application 140-1 itself (i.e., in the form of un-executed or non-performing logic instructions and/or data). The bit vector scanning application 140-1 may be stored on a computer readable medium (such as a floppy disk), hard disk, electronic, magnetic, optical, or other computer readable medium. A bit vector scanning application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a bit vector scanning application 140-1 in the processor 113 as the bit vector scanning process 140-2. Those skilled in the art will understand that the computer system 110 may include other processes and/or software and hardware components, such as an operating system not shown in this example.

During operation, processor 113 of computer system 100 accesses memory system 112 via the interconnect 111 in order to launch, run, execute, interpret or otherwise perform the logic instructions of the bit vector scanning application 140-1. Execution of bit vector scanning application 140-1 produces processing functionality in bit vector scanning process 140-2. In other words, the bit vector scanning process 140-2 represents one or more portions of the bit vector scanning application 140-1 (or the entire application) performing within or upon the processor 113 in the computer system 100.

It should be noted that, in addition to the bit vector scanning process 140-2, embodiments herein include the bit vector scanning application 140-1 itself (i.e., the un-executed or non-performing logic instructions and/or data). The bit vector scanning application 140-1 can be stored on a computer readable medium such as a floppy disk, hard disk, or optical medium. The bit vector scanning application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of bit vector scanning application 140-1 in processor 113 as the bit vector scanning process 140-2. Those skilled in the art will understand that the computer system 100 can include other processes and/or software and hardware components, such as an operating system that controls allocation and use of hardware resources associated with the computer system 100.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:

saving Program Counter content to a register;
scanning a bit vector wherein said computer system comprises a multi-threaded packet processor, wherein a bit of said bit vector correlates to a packet processing feature and wherein said packet processing feature comprises one of the group consisting of packet mirroring, packet re-mark, IP fix and packet policing;
detecting the presence of a bit of said bit vector set to a first state;
setting said bit to a second state;
using a bit position of said bit that was set to a first state to look up an instruction address for a routine corresponding to said bit set to a first state;
executing said routine; and
repeating said scanning, said detecting, said setting and said using until there are no remaining bits of said bit vector set to said first state, wherein said repeating said scanning, said detecting, said setting and said using comprises performing a branch to said register in order to execute said instruction again.

2. The method of claim 1 wherein said scanning a bit vector, said detecting the presence of a bit of said bit vector set to a first state, said setting said bit to a second state, and said using a bit position take place during a single instruction execution.

3. The method of claim 1 wherein said using a bit position comprises using said bit position to index into a jump table, said jump table containing program counter values.

4. The method of claim 1 wherein said first state of a bit comprises said bit set to a true value, and wherein said second state of said bit comprises said bit set to a false value.

5. The method of claim 1 further comprising executing a next instruction after said repeating completes.

6. A non-transitory computer readable medium having computer readable code thereon for efficient loop instruction execution using bit vector scanning, the medium including instructions in which a computer system performs operations comprising:
saving Program Counter content to a hardware link register;
scanning a bit vector, wherein said computer system comprises a multi-threaded packet processor, wherein a bit of said bit vector correlates to a packet processing feature and wherein said packet processing feature comprises one of the group consisting of packet mirroring, packet re-mark, IP fix and packet policing;
detecting the presence of a bit of said bit vector set to a first state;
setting said bit to a second state;
using a bit position of said bit that was set to a first state to look up an instruction address for a routine corresponding to said bit set to a first state;
executing said routine; and
repeating said scanning, said detecting, said setting and said using until there are no remaining bits of said bit vector set to said first state, wherein said repeating said scanning, said detecting, said setting and said using comprises performing a branch to said hardware link register in order to execute said instruction again.

7. The computer readable medium of claim 6 wherein said scanning a bit vector, said detecting the presence of a bit of said bit vector set to a first state, said setting said bit to a second state, and said using a bit position take place during a single instruction execution.

8. The computer readable medium of claim 6 wherein said using a bit position comprises using said bit position to index into a jump table, said jump table containing program counter values.

9. The computer readable medium of claim 6 wherein said first state of a bit comprises said bit set to a true value, and wherein said second state of said bit comprises said bit set to a false value.

10. The computer readable medium of claim 6 further comprising instructions for executing a next instruction after said repeating completes.

11. A computer system comprising:
a memory;
a processor;
a communications interface;
an interconnection mechanism coupling the memory, the processor and the communications interface; and
wherein the memory is encoded with an application providing efficient loop instruction execution using bit vector scanning, that when performed on the processor, provides a process for processing information, the process causing the computer system to perform the operations of:
saving Program Counter content to a hardware link register;
scanning a bit vector, wherein said computer system comprises a multi-threaded packet processor, wherein a bit of said bit vector correlates to a packet processing feature and wherein said packet processing feature comprises one of the group consisting of packet mirroring, packet re-mark, IP fix and packet policing;
detecting the presence of a bit of said bit vector set to a first state;
setting said bit to a second state;
using a bit position of said bit that was set to a first state to look up an instruction address for a routine corresponding to said bit set to a first state;
executing said routine; and
repeating said scanning, said detecting, said setting and said using until there are no remaining bits of said bit vector set to said first state, wherein said repeating said scanning, said detecting, said setting and said using comprises performing a branch to said hardware link register in order to execute said instruction again.

12. The computer system of claim 11 wherein said scanning a bit vector, said detecting the presence of a bit of said bit vector set to a first state, said setting said bit to a second state, and said using a bit position take place during a single instruction execution.

13. The computer system of claim 11 wherein said using a bit position comprises using said bit position to index into a jump table, said jump table containing program counter values.

14. The computer system of claim 11 further comprising executing a next instruction after said repeating completes.

* * * * *